(No Model.)

S. R. WILMOT.
METHOD OF MAKING BEADED TUBES.

No. 400,025. Patented Mar. 19, 1889.

Witnesses
C. M. Newman
Etta F. Pettit.

Inventor
Samuel R. Wilmot
By A. M. Wooster
Atty.

UNITED STATES PATENT OFFICE.

SAMUEL R. WILMOT, OF BRIDGEPORT, CONNECTICUT, ASSIGNOR TO THE WILMOT & HOBBS MANUFACTURING COMPANY, OF SAME PLACE.

METHOD OF MAKING BEADED TUBES.

SPECIFICATION forming part of Letters Patent No. 400,025, dated March 19, 1889.

Application filed January 28, 1889. Serial No. 297,758. (No model.)

*To all whom it may concern:*

Be it known that I, SAMUEL R. WILMOT, a citizen of the United States, residing at Bridgeport, in the county of Fairfield and State of Connecticut, have invented an Improved Method of Making Beaded Tubes; and I do hereby declare the following to be a full, clear, and exact description of the invention, such as will enable others skilled in the art to which it appertains to make and use the same.

My invention has for its object to devise a method of making beaded tubes by which I may be enabled to form this class of tubes from sheet metal rolled to tubular form, and not only to close the seam tightly where the edges of the sheet join, but also to close the edges tightly at the beads.

It is of course well understood that in the arts enormous quantities of this class of tubes are used, a familiar illustration being the hubs of children's carriages, wagons, tricycles, &c. It will be apparent that in the hubs of carriages, &c., and in all analogous uses of this class of tubes, it is essential that the seam shall be closed tightly. This can be done readily enough if the tubes are plain; but it has heretofore been impossible to close together the seams of beaded tubes, so that they will be tight enough to hold oil. In the making the edges of these tubes are pressed together, and then are finished down firmly, after which the tubes are tinned. This is found to close ordinary plain tubes perfectly, so that there is ordinarily no trouble about their holding oil. If the tubes were beaded, however, as in forming oil-grooves, it has been impossible to close the edges together, so as to prevent there being a deep V-shaped notch where the edges of the beads join. This notch in tinning becomes only partially filled with tin, leaving openings which permit the escape of the oil, thereby spoiling the appearance of the wheel, and frequently injuring clothing by smearing with oil. In order to avoid this objection and to produce a beaded tube of this class, which shall be closed perfectly tight at the beads, as well as at the seams, I have devised the novel method, of which the following description, in connection with the accompanying drawings, is a specification.

Figure 1:
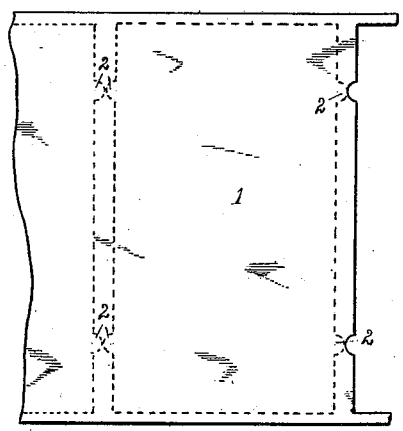
Figure 2:
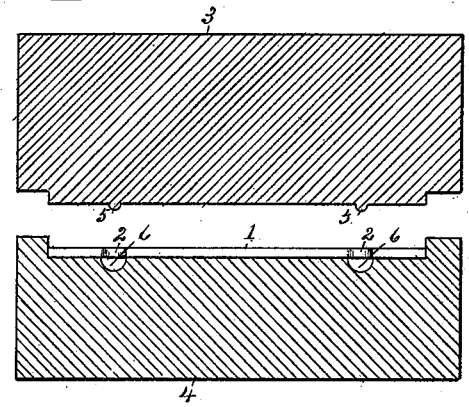
Figure 3:
Figure 4:
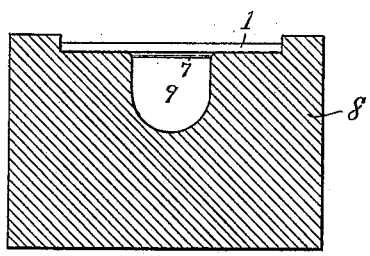
Figure 4:
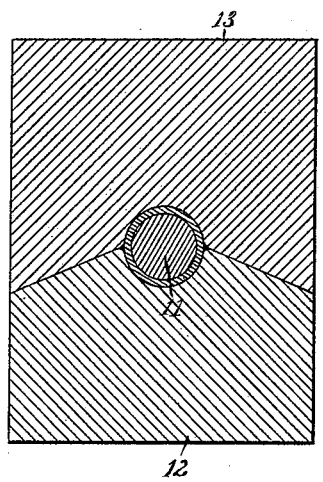
Figure 5:

Figure 1 is a plan view of a strip of metal, showing in dotted lines the shape in which the pieces to form the tubes are blanked out; Fig. 2, a cross-section of the grooved dies, showing a blank between them in position to be grooved; Fig. 3, a section of the forming-die and punch; Fig. 4, a cross-section of the closed dies, closed tube, and mandrel; and Fig. 5 is an elevation of a beaded tube as completed by my novel method.

The blanks, which are denoted by 1, are cut the exact size of the tube laid out in plan, except that on opposite sides of the blanks I leave teats or projections of metal corresponding in number to the beads that are required upon the finished tube. It will of course be understood that in practice these blanks are formed in large quantities at a time. The next step is to form grooves in the blanks, which form the beads in the completed tubes. This may be readily accomplished by placing the blanks between upper and lower dies, 3 and 4, one of said dies having projections 5 and the other having grooves 6, to correspond therewith, whereby grooves 7 are formed in the blanks. The next step is to place the grooved blank in a forming-die, 8, grooved to correspond with the blank and having a central longitudinal recess, 9. 10 is a punch acting in connection with this die to form the grooved blank into a U shape. The next and final operation is clearly illustrated in Fig. 4. A mandrel, 11, is placed within the U-shaped grooved blank, which is then laid in a die, 12, which is of course grooved to correspond with the grooves in the tube, and an upper die, 13, similarly grooved, is closed upon it, whereby the ends of the U-shaped blank are curved about the mandrel, and the edges forced tightly together. In this operation the teats 2 upon the opposite sides of the blanks, which have of course been grooved the same as the bodies of the blanks in the grooving operation, are brought together and caused to register with each other. These teats are in practice made just the exact size to furnish the necessary amount of metal to close the ends of the grooves together tightly at the seams, the grooves in the blanks forming the beads in the completed tubes.

It will be noticed that the line of contact of the die-blocks is not a horizontal line, but that said line of contact inclines downward and outward from the dies proper. This is in order to insure that the ends of the U-shaped blank will both inevitably be turned inward toward each other when the dies close together. In practice the mandrel with the beaded tube upon it is turned in the grooved dies, and several blows are struck to insure the perfect closing of the joint.

There is an obvious modification of the method described above, which will be apparent to any skilled mechanic the instant my invention is disclosed, and which is not thought to require illustration. It is simply this. If preferred, the continuous strips of metal from which the blanks are cut transversely may be grooved before the blanks are cut, instead of cutting the blanks from the flat strips and then grooving each blank separately. Either way is found to work perfectly in practice. The gist of my invention lies in providing the edges of the blanks with teats corresponding with the edges of the grooves—that is to say, whether the grooves are formed before or after the blanks are cut. The teats are formed at the exact position to form the ends of the grooves, the result being that at the grooves the edges of the blanks project outward sufficiently, so that when the ends are closed together perfectly tight joints are formed at the beads.

Having thus described my invention, I claim—

The method of making beaded tubes, which consists in forming blanks having teats at the edges where beads are required in the finished tubes, grooving the blanks across transversely in the line of the teats, and finally rolling the grooved blank about a mandrel and closing the edges firmly together, the grooves forming the beads in the completed tube and the metal of the teats serving to close the joint tightly at the beads.

In testimony whereof I affix my signature in presence of two witnesses.

SAMUEL R. WILMOT.

Witnesses:
A. M. WOOSTER,
ETTA F. PETTIT.